US006268984B1

(12) United States Patent
Boutaghou

(10) Patent No.: US 6,268,984 B1
(45) Date of Patent: Jul. 31, 2001

(54) MAGNET CONFIGURATION FOR HEAD-LEVEL MICROACTUATOR

(75) Inventor: Zine-Eddine Boutaghou, Vadnais Heights, MN (US)

(73) Assignee: Seagate Technology LLC, Bloomington, MN (US)

( * ) Notice: Subject to any disclaimer, the term of this patent is extended or adjusted under 35 U.S.C. 154(b) by 0 days.

(21) Appl. No.: 09/315,005

(22) Filed: May 19, 1999

Related U.S. Application Data

(60) Provisional application No. 60/116,834, filed on Jan. 22, 1999.

(51) Int. Cl.[7] ............................... G11B 21/24; G11B 5/56
(52) U.S. Cl. .......................................................... 360/294.5
(58) Field of Search ............................... 360/294, 294.1, 360/294.5, 294.6, 290, FOR 204

(56) References Cited

U.S. PATENT DOCUMENTS

| 3,678,482 | 7/1972 | Billawala ........................... 360/235.4 |
| 3,924,268 | 12/1975 | McIntosh et al. ................. 360/78.05 |

(List continued on next page.)

FOREIGN PATENT DOCUMENTS

| 0 412 221 B1 | 11/1989 | (EP) . |
| 63-122069 | 5/1988 | (JP) . |
| 02-263369 | 4/1989 | (JP) . |
| 04-134681 | 5/1992 | (JP) . |
| 04-368676 | 12/1992 | (JP) . |
| 05-094682 | 4/1993 | (JP) . |
| 06-020412 | 1/1994 | (JP) . |
| 07-085621 | 3/1995 | (JP) . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996, Micro–Electromech. Sys, MEMS '96 proceedings p. 216–221.

"An Experiment for Head Positioning System Using Sub–micron Track–width GMR Head" by Yoshikawa et al., *IEEE Transactions on Magnetics*, vol. 32, No. 5, Sep. 1996.

(List continued on next page.)

*Primary Examiner*—Robert S. Tupper
*Assistant Examiner*—Julie Anne Watko
(74) *Attorney, Agent, or Firm*—Kinney & Lange, P.A.

(57) ABSTRACT

A microactuation system is disclosed for selectively altering a position of a transducing head carried by a slider in a disc drive system with respect to a track of a rotatable disk having a plurality of concentric tracks. The disc drive system includes a load beam having a base for attachment to an actuator arm and a head suspension for supporting the slider over the rotatable disc. The microactuation system includes a closed magnetic circuit having a stator attached to a head suspension or a flexure and a rotor attached to the slider carrying the transducing head. Both the rotor and the stator include permanent magnets having the same magnetic polarity.

13 Claims, 7 Drawing Sheets

U.S. PATENT DOCUMENTS

| | | | |
|---|---|---|---|
| 4,374,402 | 2/1983 | Blessom et al. | 360/266.2 |
| 4,605,977 | 8/1986 | Matthews | 360/234.7 |
| 4,620,251 | 10/1986 | Gitzendanner | 360/244.2 |
| 4,651,242 | 3/1987 | Hirano et al. | 360/254.3 |
| 4,764,829 | 8/1988 | Makino | 360/294 |
| 4,853,810 | 8/1989 | Pohl et al. | 360/234.7 |
| 4,914,725 | 4/1990 | Belser et al. | 318/560 |
| 5,021,906 | 6/1991 | Chang et al. | 360/235.1 |
| 5,034,828 | 7/1991 | Ananth et al. | 360/75 |
| 5,065,268 | 11/1991 | Hagen | 360/244.8 |
| 5,079,659 | 1/1992 | Hagen | 360/234.6 |
| 5,105,408 | 4/1992 | Lee et al. | 369/44.15 |
| 5,177,652 | 1/1993 | Yamaguchi et al. | 360/78.05 |
| 5,189,578 | 2/1993 | Mori et al. | 360/294.6 |
| 5,255,016 | 10/1993 | Usui et al. | 347/71 |
| 5,276,573 | 1/1994 | Harada et al. | 360/235.3 |
| 5,303,105 | 4/1994 | Jorgenson | 360/294.3 |
| 5,521,778 | 5/1996 | Boutaghou | 360/264.5 |
| 5,552,809 | 9/1996 | Hosono et al. | 347/10 |
| 5,623,461 | 4/1997 | Sohmuta | 369/32 |
| 5,657,188 | 8/1997 | Jurgenson et al. | 360/294.3 |
| 5,745,319 | 4/1998 | Takekado et al. | 360/78.05 |
| 5,764,444 | 6/1998 | Imamura et al. | 360/294.4 |
| 5,781,381 | 7/1998 | Koganezawa et al. | 360/294.3 |
| 5,793,571 | 8/1998 | Jurgenson et al. | 29/603.25 |
| 5,796,558 | 8/1998 | Hanrahan et al. | 360/294.6 |
| 5,805,382 | 9/1998 | Lee et al. | 360/244.1 |
| 5,867,347 | 2/1999 | Knight et al. | 360/294.5 |
| 5,896,246 | 4/1999 | Budde et al. | 360/244.4 |
| 5,898,541 | 4/1999 | Boutaghou et al. | 360/294.4 |
| 5,898,544 | 4/1999 | Krinke et al. | 360/264.5 |
| 5,936,805 * | 8/2000 | Imaino | 360/294.5 |
| 6,043,957 * | 3/2000 | Hattori et al. | 360/294.3 |
| 6,064,550 * | 5/2000 | Koganezawa | 360/294.3 |

OTHER PUBLICATIONS

"Micro Electrostatic Actuators in Dual–Stage Disk Drives with High Track Density" by Tang et al., *IEEE Transactions on Magnetics*, vol. 32, No. 5, Sep. 1996, p. 3851–3853.

"Piezoelectric Microactuator Compensating for Off–Track Errors in Magnetic Disk Drives" by Imamura et al, *Advance Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991, p. 5298–5300.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, p. 18–27, Mar. 1995.

* cited by examiner

MAGNET CONFIGURATION FOR HEAD-LEVEL MICROACTUATOR

CROSS-REFERENCE TO RELATED APPLICATION

This application claims priority from provisional application number 60/116,834, filed Jan. 22, 1999, for "Magnet Configuration for Head Level Micro-Actuation" by Zine-Eddine Boutaghou.

BACKGROUND OF THE INVENTION

The present invention relates to a head-level microactuator having improved efficiency and improved ease of manufacture. More particularly, it relates to a magnetic microactuator located between a suspension and a slider in a disc drive system to selectively move a transducing head radially with respect to a rotatable disc.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head at the end of the actuator arm. The large-scale motor lacks a sufficient resolution to effectively accommodate high track-density discs. Thus, a high resolution head positioning mechanism, or microactuator, is necessary to accommodate the more densely spaced tracks.

One promising approach for high resolution head positioning involves employing a high resolution microactuator in addition to the conventional lower resolution actuator motor, thereby effecting head positioning through dual-stage actuation. Various microactuation designs have been considered to accomplish high resolution head positioning. One design involves inserting a silicon-based thin film structure between the suspension and the slider in a disc drive assembly. A major technical challenge in implementing such a microactuator is to provide sufficiently large actuation force to overcome friction forces and spring bias forces to drive the head at a speed high enough to accommodate the required bandwidth. Such a design must be realized in a relatively small wafer area, to keep costs reasonable and to allow easy integration into the disc drive design.

There is a need in the art for a microactuator design providing large actuation force with reasonable power consumption and within a reasonable wafer area to microposition a transducing head at a speed that accommodates the high bandwidth required by high performance disc drives and can be manufactured cost effectively.

BRIEF SUMMARY OF THE INVENTION

The present invention is a dual-stage actuation assembly for positioning a slider carrying a transducing head in a disc drive system with respect to a selected radial track of a rotatable disc. The dual-stage actuation assembly includes a movable actuator arm controlled by an actuator motor and a suspension assembly, including a flexure, supported by the actuator arm. The assembly includes a microactuator having a stator attached to the flexure and a rotor attached to the slider. The rotor is transversely movable with respect to the stator and a horizontal plane generally parallel to the surface of the disc. The assembly contains a magnetic circuit arranged vertically in a plurality of horizontal planes configured to effect motion of the rotor with respect to the stator.

DETAILED DESCRIPTION

Figure 1:
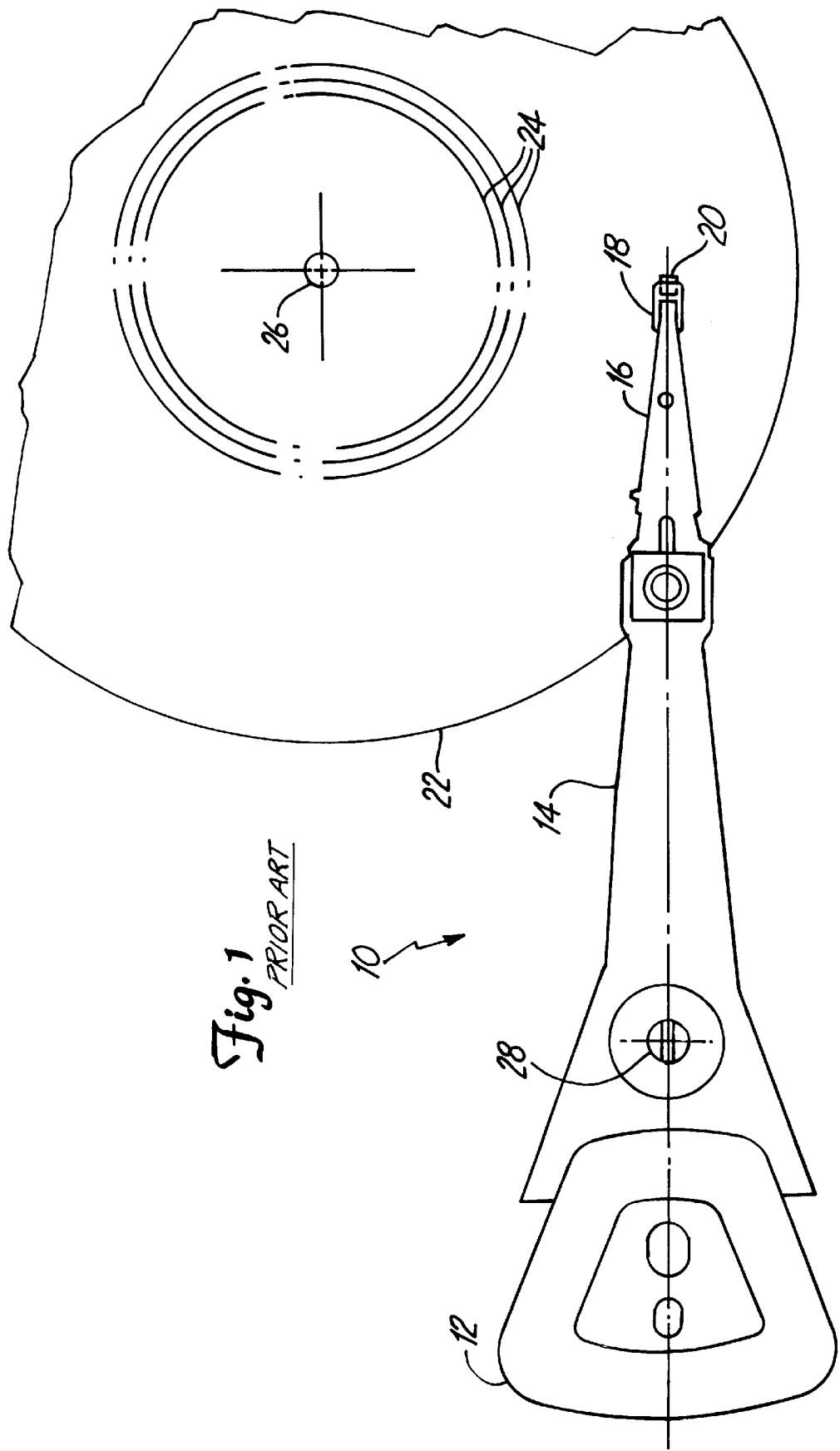
FIG. 1 is a top view of a disc drive actuation system for positioning a slider over tracks of a disc.

FIG. 1 shows a top view of a disc drive actuation system 10 for positioning a transducing head (not shown) over a track of a magnetic disc as known in the prior art. The actuation system 10 includes, as shown from left to right in FIG. 1, a voice coil motor (VCM) 12, an actuator arm 14, a suspension 16, a flexure 18, and a slider 20. The slider 20 is connected to the distal end of the suspension 16 by the flexure 18. The suspension 16 is connected to the actuator arm 14 which, in turn, is coupled to the VCM 12. As shown on the right side of FIG. 1, the disc drive assembly includes a disc 22 having a multiplicity of tracks 24 which rotates about an axis 26. During operation of the disc drive assembly, rotation of the disc 22 generates air movement which is encountered by the slider 20. This air movement acts to keep the slider 20 aloft a small distance above a surface of the disc 22 allowing the slider to "fly" above the surface of the disc 22.

The VCM 12 is selectively operated to move the actuator arm 14 around an axis 28, thereby moving the suspension 16 and positioning the transducing head (not shown) carried by the slider 20 between tracks 24 of the disc 22. Proper positioning of the transducing head (not shown) is necessary for reading and writing of data on the concentric tracks 24 of the disc 22. For a disc 22 having a high track density, however, the VCM 12 lacks sufficient resolution and frequency response to position the transducing head (not shown) on the slider 20 over a selected track 24 of the disc 22. Therefore, a higher resolution actuation device is used.

Figure 2:
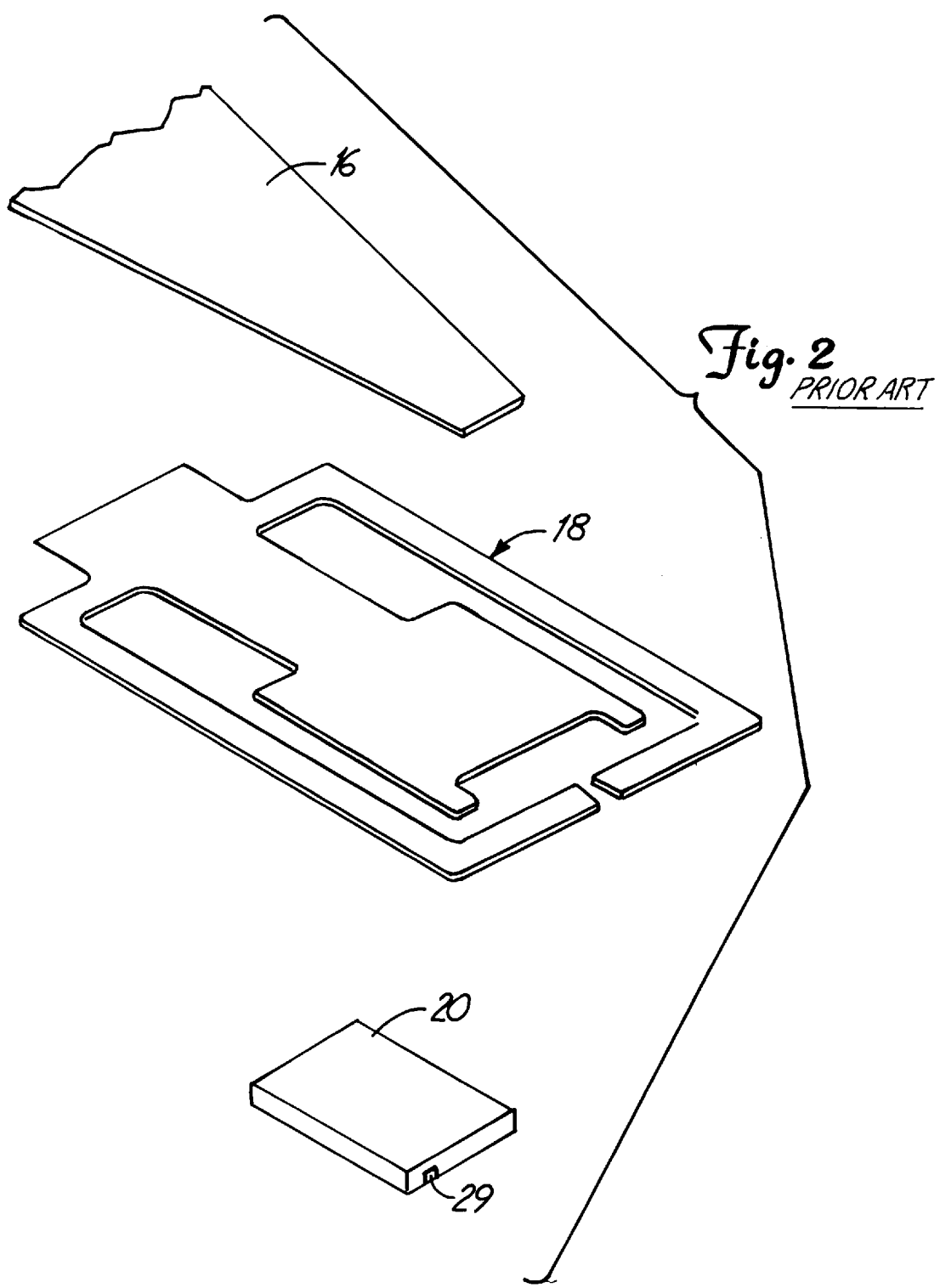
FIG. 2 is an exploded perspective view of the distal portion of the disc drive actuation system of FIG. 1.

FIG. 2 is an exploded perspective view of the distal portion of the disc drive actuation system 10 (shown on the right hand side in FIG. 1) as known in the prior art. Shown in FIG. 2, from top to bottom, are the suspension 16, the flexure 18, and the slider 20 carrying the transducing head 29. The flexure 18 is attached to the suspension 16 and the slider 20 attaches to a bottom surface of the flexure 18. The transducing head 29 is carried by the slider 20.

The flexure 18 provides a spring connection between the slider 20 and the suspension 16. The flexure 18 is configured such that it allows the slider 20 to move in pitch and roll directions to compensate for fluctuations in the spinning surface of the disc 22. Many different types of flexures 18, also known as gimbals, are known to provide the spring connection allowing for pitch and roll movement of the slider 20 and can be used with the present invention.

During operation of the disc drive actuation system 10, the suspension 16, the flexure 18, and the slider 20 are all moved together as coarse positioning is performed by VCM 12 (shown in FIG. 1) moving actuator arm 14 (shown in FIG. 1). To achieve fine positioning of the transducing head 29, the present invention uses a microactuator for effecting transverse motion of the slider 20 with respect to the flexure 18.

Figure 3:
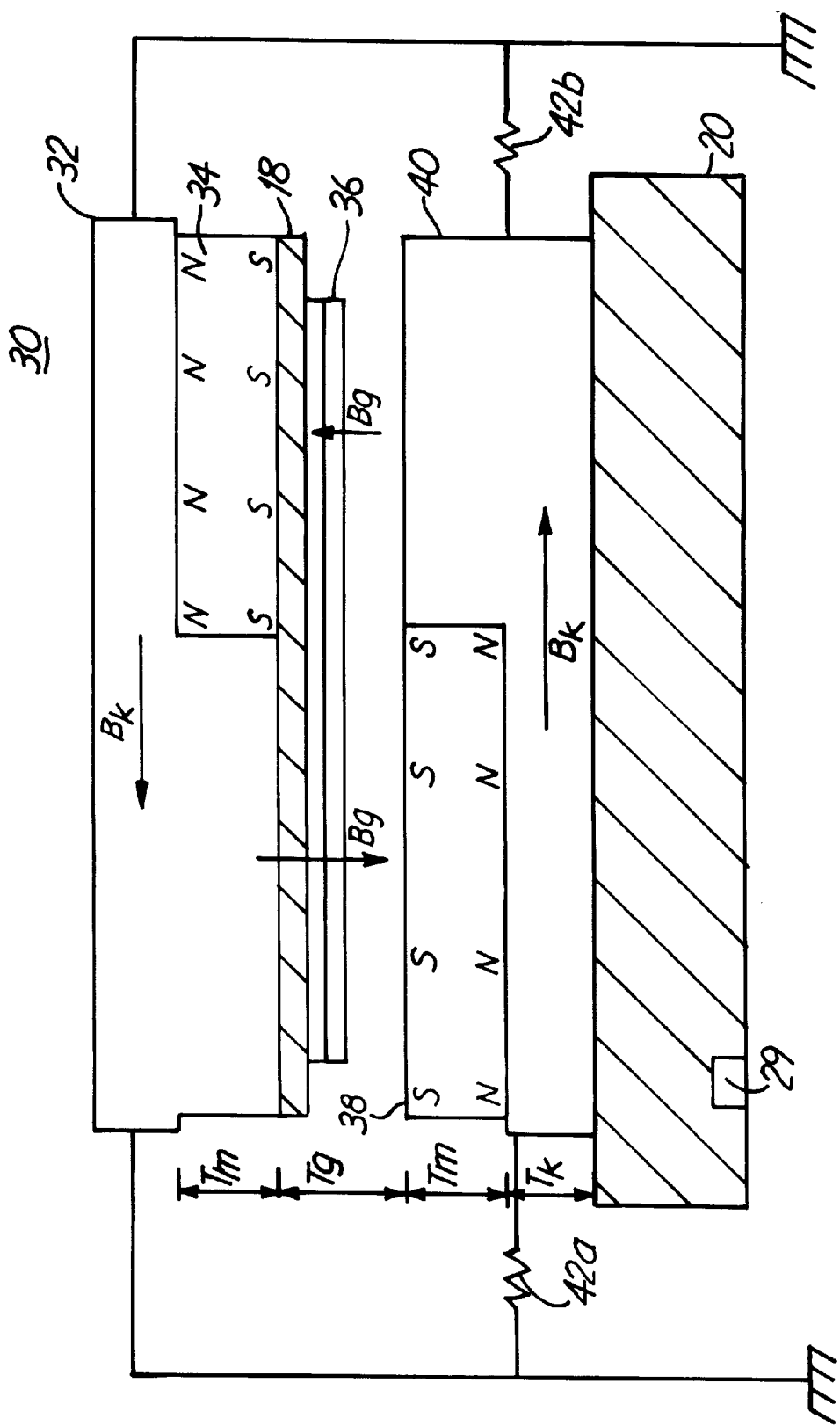
FIG. 3 is a schematic diagram of a microactuation system for use in a dual-stage disc drive actuation system for high resolution positioning of a slider according to a first embodiment of the present invention.

FIG. 3 is a schematic diagram of a microactuation system 30 for use in a dual-stage disc drive actuation system for high resolution positioning of a transducing head 29 according to a first embodiment of the present invention. As shown from top to bottom in FIG. 3, the microactuation system 30 includes a top ferromagnetic keeper 32, a top magnet 34, a coil 36, a bottom magnet 38, and a bottom ferromagnetic keeper 40. As shown in FIG. 3, the top ferromagnetic keeper 32 is attached to a top surface of the flexure 18 and the coil 36 is attached to a bottom surface of the flexure 18. Also as shown in FIG. 3, the slider 20 is mounted to a bottom surface of the bottom ferromagnetic keeper 40. The cross hatching of the flexure 18 and the slider 20, in FIG. 3, is done solely for the purpose of distinguishing these components and is not intended to signify a sectional view. The top magnet 34 and the bottom magnet 38 are configured such that they generate magnetic flux flowing in a path illustrated by the arrows in FIG. 3, referred to as $B_g$ (for flux in the air gap) and $B_k$ (for flux in the keepers), which forms a closed magnetic circuit.

During operation of the microactuation system 30, an electric current is applied to the coil 36. The current flowing through the coil 36 interacts with the magnetic flux field. This interaction causes a force to be exerted on the top magnet 34 and the bottom magnet 38 in a lateral direction (across the tracks 24 of the disc 22), the force being controllable to achieve high resolution movement for fine positioning of the transducing head 29 with respect to the tracks 24 of the disc 22.

The actuation force achieved by the magnetic circuit shown in FIG. 3 is governed by the Lorentz equation, with the current through the coil 36 flowing at a 90 degree angle to the air gap flux ($B_g$), given as:

$$F_y = N\ I\ B_g L_m$$

where $F_y$ is the actuation force, N is the number of coil traverses across the face of the top magnet 34 and the bottom magnet 38, I is the current in the coil, $B_g$ is the flux density in the air gap, and $L_m$ is the length of the faces of top magnet 34 and bottom magnet 38 (the length into the paper as the magnets are shown in FIG. 3). In addition to the actuation force, there is a force of attraction between the top magnet 34 and the bottom ferromagnetic keeper 40 and between the top ferromagnetic keeper 32 and the bottom magnet 38, given as:

$$F_z = \frac{AB_g^2}{2\mu_0}$$

where $F_z$ is the attraction force, A is the area of the faces of top magnet 34 and bottom magnet 38, $B_g$ is the air gap flux density, and $\mu_0$ is the permeability of the free space.

An actuation stroke (i.e., the amount of lateral displacement of the bottom keeper 40 with respect to a baseline position) can be determined from the designed resonant frequency of the microactuator and the actuation force achieved. The microactuator resonant frequency is generally controlled by the servo system of the disc drive, and is also affected by the mass of the microactuator springs and the offtrack stiffness of the springs. Large actuation stokes are achieved only with rather significant vertical attraction forces between the magnets 34, 38 and the keepers 32, 40. The microactuator springs must be designed to support both this vertical attraction force and the vertical pre-load force applied to the slider with minimal vertical deflection. To accomplish this, the net loading point of the microactuation system 30 is located at a point where the bending moments from the air-bearing pre-load force and the magnetic attraction force sum to zero.

In the force equations given above, the air gap flux density (B) is given as:

$$B_g = \frac{B_r}{(1 + T_g/T_m)}$$

where $B_r$ is the remanant magnetization of the magnetic material of top magnet 34 and bottom magnet 38, $T_g$ is the thickness of the air gap between top keeper 32 and bottom keeper 40, including open space and coil 36, and $T_m$ is the thickness of magnets 34, 38.

The minimum thicknesses of top keeper 32 and bottom keeper 40 must be sufficient to carry the magnetic flux generated by top magnet 34 and bottom magnet 38 linking the closed magnetic circuit without saturating. This minimum thickness may be calculated using the following equation:

$$T_k = W_m \frac{B_g}{B_s}$$

where $T_k$ is the minimum thickness of top keeper 32 and bottom keeper 40, $W_m$ is the width of magnets 34, 38 (the distance across the page as the magnets are shown in FIG. 3) and $B_s$ is the saturation moment of the material used to form top keeper 32 and bottom keeper 40. Thus, it can be appreciated that a design with a set of four magnets requires only half the keeper thickness of a design with two magnets, since each magnet face is half as wide.

Figure 4:
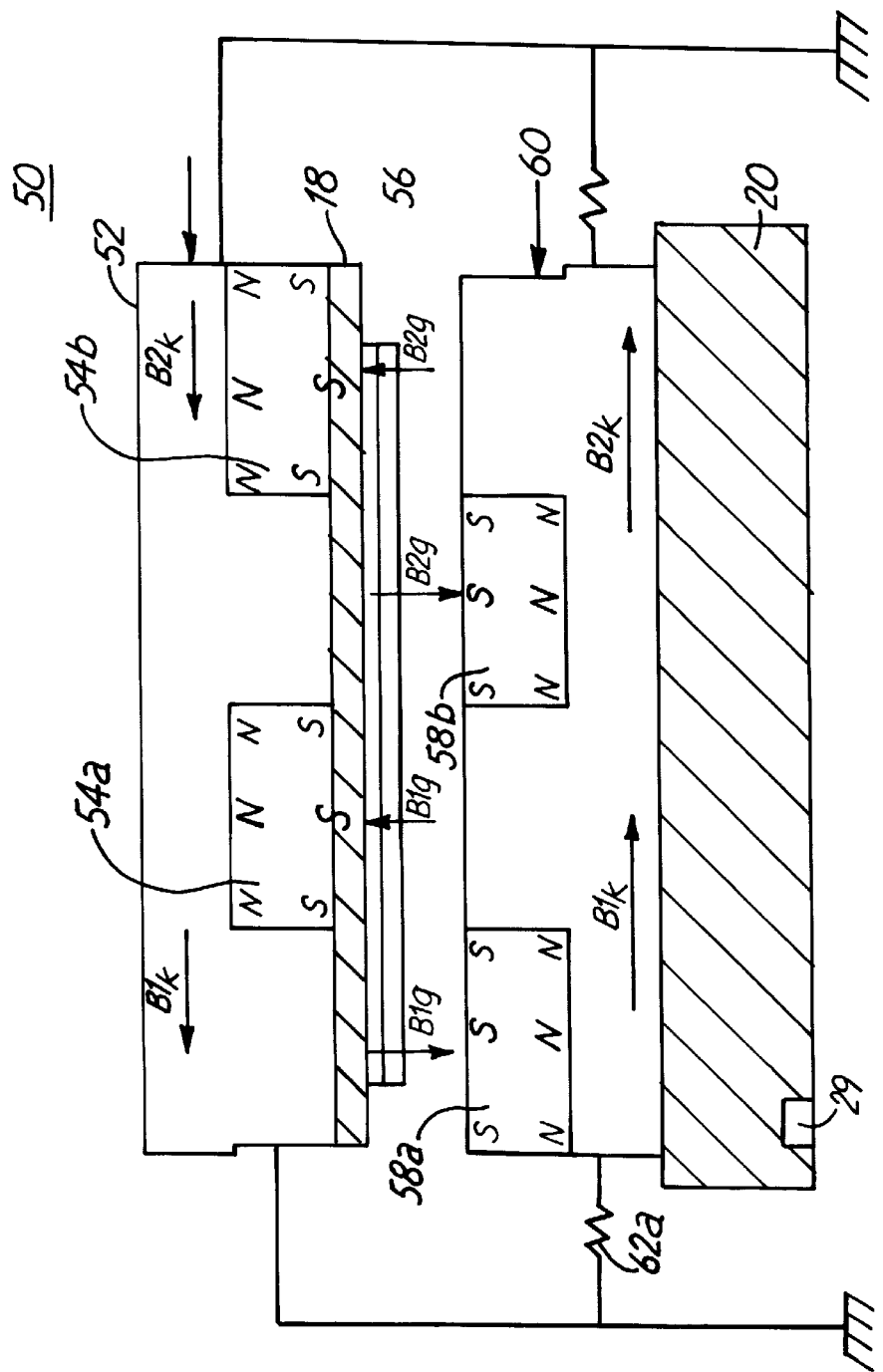
FIG. 4 is a schematic view of a microactuation system for use in a dual-stage disc drive actuation system for high resolution positioning of a slider according to a second embodiment of the present invention.

FIG. 4 shows a schematic view of a microactuation system 50 for use in a dual-stage disc drive actuation system for high resolution positioning of a transducing head 29 according to a second embodiment of the present invention. As shown from top to bottom in FIG. 4, the microactuation system 50 includes a top ferromagnetic keeper 52, top magnets 54a, 54b, a coil 56, bottom magnets 58a, 58b, and a bottom ferromagnetic keeper 60. As shown in FIG. 4, the top ferromagnetic keeper 52 is attached to a top surface of the flexure 18 and the coil 56 is attached to a bottom surface of the flexure 18. The slider 20 is mounted to a bottom surface of the bottom ferromagnetic keeper 60. The cross hatching of the flexure 18 and the slider 20, in FIG. 4, is done solely for the purpose of distinguishing these components and is not intended to signify a sectional view.

The top magnets 54a, 54b and the bottom magnets 58a, 58b are configured such that you generate a magnetic flux flowing in two closed magnetic circuits. The path of the first closed magnetic circuit is illustrated by the arrows on the left half of FIG. 4 referred to as the $B1_g$ (for flux in the air gap) and $B1_k$ (for flux in the keepers). The second closed magnetic circuit is illustrated by the arrows on the right half of FIG. 4 referred to as $B2_g$ (for flux in the air gap) and $B2_k$ (for flux in the keepers). The bottom keeper 60 is flexibly coupled to the top keeper 52 by microactuation springs 62a, 62b which allow movement of the bottom keeper 60 laterally with respect to the top keeper 52 as described by the above equations.

Figure 5:
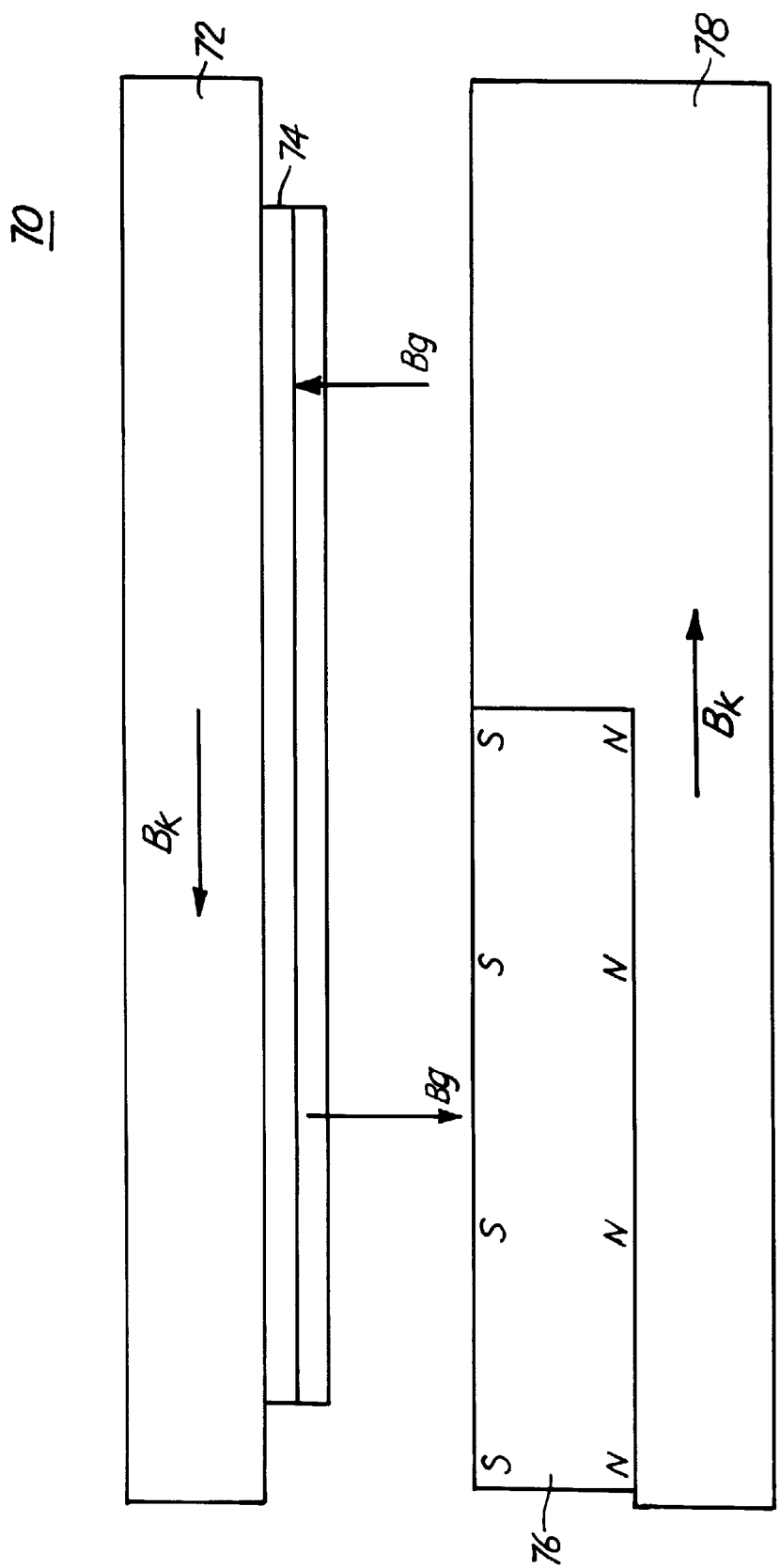
FIG. 5 is a schematic view of a microactuation system for use in a dual-stage disc drive actuation system for high resolution positioning of a slider according to a third embodiment of the present invention.

FIG. 5 shows a schematic view of a microactuation system 70 for use in a dual-stage disc drive actuation system for high resolution positioning of a transducing head 29 (not shown) according to a third embodiment of the present invention. As shown from top to bottom in FIG. 5, microactuation system 70 includes a top ferromagnetic keeper 72, a coil 74, a bottom magnet 76, and a bottom ferromagnetic keeper 78. This configuration generates magnetic flux flowing in a path illustrated by the arrows in FIG. 5, referred to as Bg (for flux in the air gap) and Bk (for flux in the keepers), which forms a closed magnetic circuit. Energizing the coil 74 causes lateral motion of the bottom ferromagnetic keeper 78 with respect to the top ferromagnetic keeper 72 consistent with the above equations.

As illustrated by the schematic diagram of FIGS. 3, 4, and 5, the portion of the microactuation systems 30, 50, 70 supporting the slider 20 is flexibly coupled to the portion of the microactuation systems 30, 50, 70 connected to the flexure 18. This flexible connection may be achieved by any number of techniques generally known in the prior art. One particular technique is disclosed in U.S. patent application Ser. No. 09/315,006 filed May 19, 2000 by Crane, et al. entitled "Magnetic Microactuator" which is assigned to Seagate Technology, Inc., the assignee of the present application.

A significant advantage to the microactuation systems shown in FIGS. 3, 4, and 5 is that they may be constructed using an efficient manufacturing process. The separation of the magnets 34, 38 (as shown in FIG. 3) into a top layer and a bottom layer allows for a simpler, more cost-effective manufacturing technique.

Figure 6A:
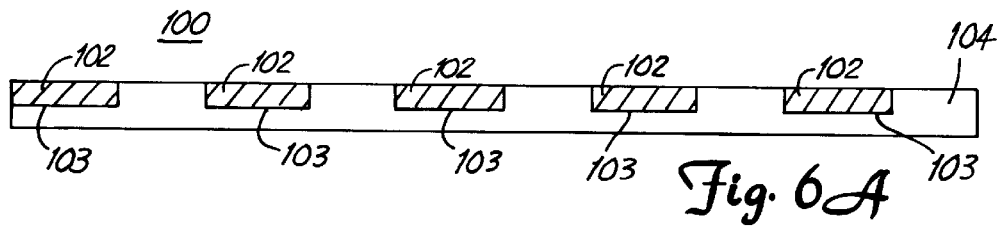
FIGS. 6A and 6B are a side view and a top view, respectively, of a keeper assembly according to the present invention.
Figure 6B:
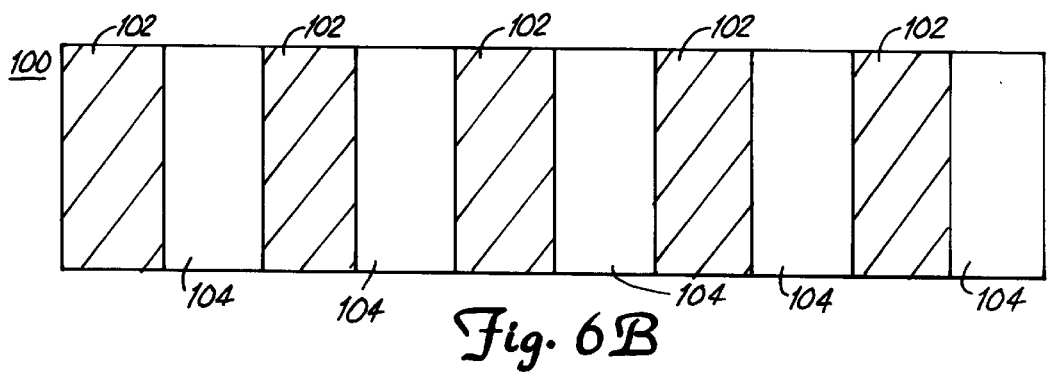

FIGS. 6A and 6B show a side view and a top view, respectively, of a keeper assembly 100 for manufacturing the keeper/magnet assemblies used in the present invention (shown in FIG. 3 as reference numerals 32 and 34 and as reference numerals 38 and 40). Any cross hatching appearing in FIGS. 6–9 is done solely for the purpose of ease of viewing and is not intended to indicate a sectional view. The keeper assembly 100 includes magnetic material 102 and a keeper 104. The magnetic material 102 may consist of any magnetic material generally known to one of skill in the art. Some exemplary magnetic materials include ceramic magnets, neodymium iron boron, and samarium cobalt. Ceramic magnets and samarium cobalt magnets are able to withstand process temperatures of 220 degrees Celsius, typically experienced in solder reflow ovens. Neodymium iron boron is limited to process temperatures below 150 degrees Celsius. The keeper 104 is constructed from a ferromagnetic material such as cobalt-iron, for example.

To assemble the keeper assembly 100, parallel notches 103 are cut into and run the width of keeper 104. The magnetic material 102 fits into the notches 103 and is attached to the keeper 104 as shown in FIGS. 6A and 6B.

Figure 7:
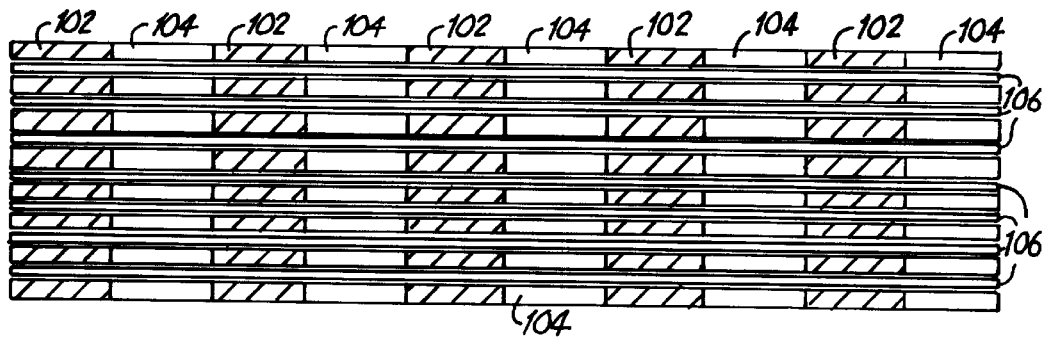
FIG. 7 is a top view of the keeper assembly shown in FIGS. 6A and 6B after further processing.

The next step in the manufacturing process is to cut the magnetic material 102 into sizes that may be used with the microactuation systems 30, 50, 70 of the present invention. FIG. 7 shows a top view of the keeper assembly 100 having grooves 106 cut into a top surface. As illustrated in FIG. 7, a series of parallel grooves 106 are cut longitudinally into a top surface of the keeper assembly 100 at a depth sufficient to completely sever the magnetic material 102. The debris generated by this cutting process is then removed prior to continuing the manufacturing process. The removal of debris at this stage is facilitated by the fact that a magnetic material has not yet been magnetized and thus the debris does not tend to cling to the keeper assembly 100. After removal of all debris, a protective layer may be deposited on the top surface of the keeper assembly 100.

Figure 8:
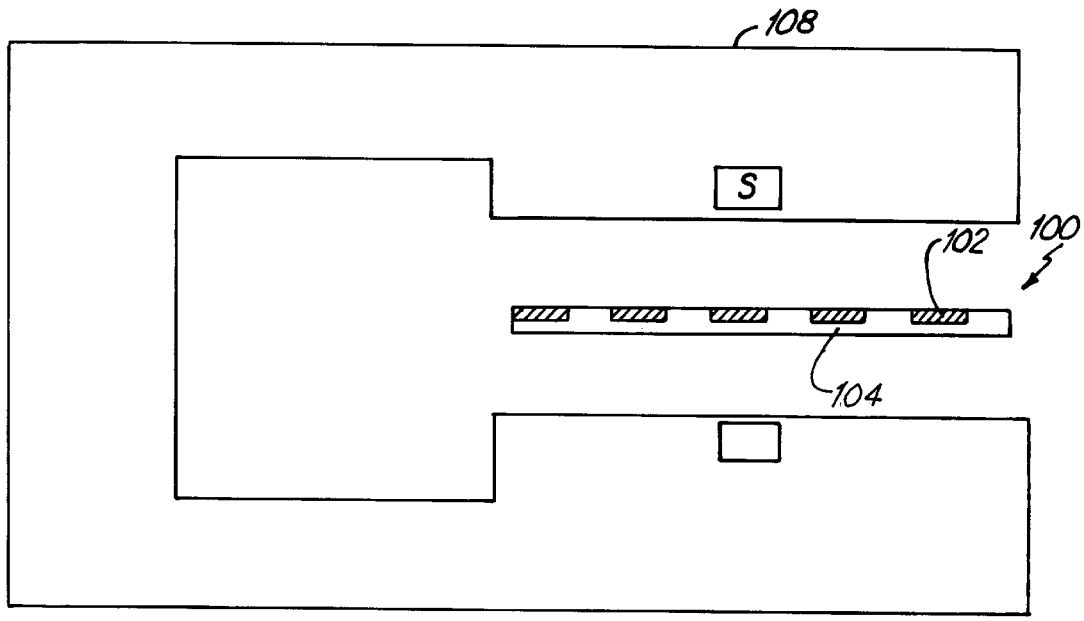
FIG. 8 is a schematic diagram showing the keeper assembly of FIG. 7 subjected to an electromagnetic field.

The next step in the manufacturing process is to magnetize the magnetic material 102. FIG. 8 shows the keeper assembly 100 as subjected to a magnetic field generated by electromagnet 108. The magnetic field may be generated by any technique known to those with skill in the art. The amount of magnetization achieved can be controlled by the strength of the magnetic field and the time of exposure.

Figure 9:
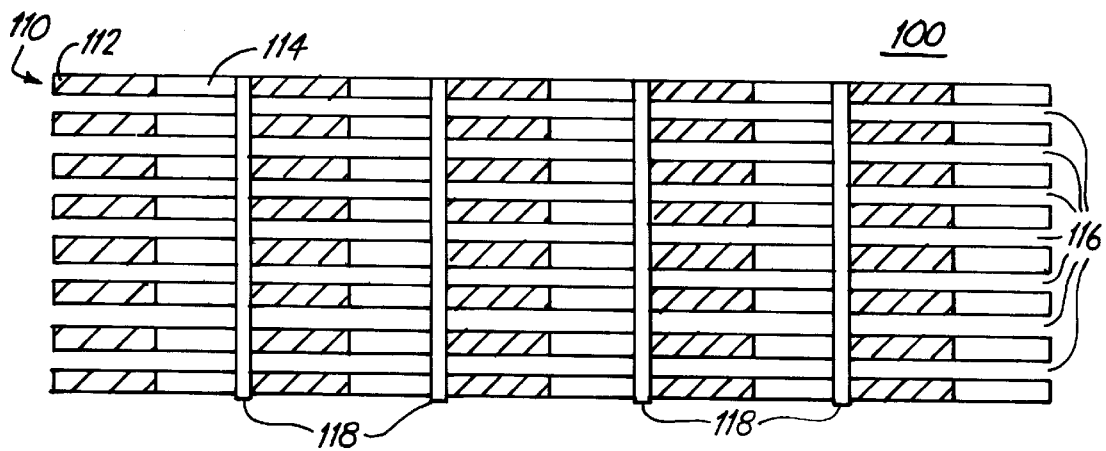
FIG. 9 is a top view of the keeper assembly of FIGS. 6A and 6B after final processing.

After magnetization is complete, the keeper assembly 100 is cut into individual magnet/keeper units for use in the microactuation systems of the present invention. FIG. 9 shows a top view of the keeper assembly 100 after completion of the cutting step. During this cutting step, the keeper assembly 100 is cut completely through by making longitudinal cuts 116 and lateral cuts 118. The final product is a magnet/keeper assembly 110 consisting of one magnet 112 and one keeper 114. Where desired, the lateral cuts 118 may be placed before every other set of magnets 112 such that the resulting magnet/keeper assembly 110 includes two magnets 112 in the keeper assembly 114. After cutting, the magnet/keeper assemblies 110 are removed from the non-magnetic carrier and are ready for use in constructing a microactuation system.

Magnet/keeper assemblies 110 may then be used to construct, for example, the microactuation system 30 of the present invention. To construct the microactuation system 30, two magnet/keeper assemblies 110 are required. One of the microactuation assemblies 110 is rotated 180 degrees about a lateral axis and placed above the other magnet/keeper assembly 110 as shown in FIG. 3. Two magnet/keeper assemblies are then attached to each other and to the other components of the microactuation system 30 as shown in FIG. 3.

An advantage of the manufacturing process of the present invention is that all of the magnetic material 102 may be magnetized as one piece. This overcomes the problem faced in the prior art associated with magnetizing adjacent magnets with opposite polarities.

Although the present invention has been described with reference to preferred embodiments, workers skilled in the art will recognize that changes may be made in form and detail without departing from the spirit and scope of the invention.

What is claimed is:

1. A disc drive mechanism for high resolution positioning of a transducing head carried by a slider with respect to a rotatable disc having a plurality of concentric tracks, the mechanism comprising:

means for supporting the transducing head over the rotatable disc; and means for selectively positioning the transducing head adjacent to one of the concentric tracks of the disc.

2. A dual-stage actuation assembly for positioning a slider carrying a transducing head in a disc drive system with respect to a selected radial track of a rotatable disc, a dual-stage actuation assembly comprising:

a moveable actuator arm controlled by an actuator motor;

a suspension assembly supported by the actuator arm, the suspension assembly including a flexure;

a microactuator comprising a stationary keeper located in a first horizontal plane generally parallel to the surface of the disk and attached to the flexure, and a moving keeper located in a second horizontal plane and supporting the slider, the moving keeper movably coupled to the stationary keeper;

a first magnet disposed within the moving keeper, the first magnet configured to effect motion of the moving keeper with respect to the stationary keeper; and a coil disposed between and generally parallel to the stationary keeper and the moving keeper.

3. The dual-stage actuation assembly of claim 2 further comprising a second magnet disposed within the stationary keeper, the first and second magnets operable in response to an electric current applied to the coil to cause movement of the moving keeper in the second horizontal plane.

4. The dual-stage actuation assembly of claim 3 wherein the first magnet and the second magnet are constructed from samarium cobalt.

5. The dual-stage actuation assembly of claim 3 wherein the moving keeper and the stationary keeper are constructed from a ferromagnetic material.

6. The dual-stage actuation assembly of claim 3 wherein the coil comprises a dual-layer coil suspended between the moving keeper and the stationary keeper.

7. The dual-stage actuation assembly of claim 2 further comprising a second magnet disposed within the moving keeper and a third and fourth magnet disposed within the stationary keeper, the magnets configured such that a first and a second magnetic flux circuits are formed, the magnets operable in response to a current provided to the coil to move laterally and thereby cause movement of the moving keeper in the second horizontal plane.

8. The dual-stage actuation assembly of claim 7 wherein the first magnet and the second magnet are constructed from samarium cobalt.

9. The dual-stage actuation assembly of claim 7 wherein the moving keeper and the stationary keeper are constructed from a ferromagnetic material.

10. The dual-stage actuation assembly of claim 7 wherein the coil comprises a dual-layer coil suspended between the moving keeper and the stationary keeper.

11. For use in a disc drive having an actuator arm, a suspension extending from the actuator arm and a slider, a magnetic microactuator for positioning the slider carrying a transducing head with respect to a selected radial track of a rotatable disc, the magnetic microactuator comprising:

a stationary keeper mounted at a distal end of the suspension including at least one permanent magnet;

a moving keeper connected to the slider and including at least one permanent magnet, the moving keeper flexibly coupled to the stationary keeper and disposed parallel to and below the stationary keeper; and a coil disposed substantially parallel to and between the stationary keeper and the moving keeper.

12. The magnetic microactuator of claim 11 wherein the stationary keeper includes a first permanent magnet and a second permanent magnet having the same polarity as the first permanent magnet and further wherein the moving keeper includes a third permanent magnet and a fourth permanent magnet having the same polarity as the third permanent magnet.

13. The magnetic microactuator of claim 12 wherein the magnets are disposed such that a first and a second magnetic flux circuit are formed thereby.

* * * * *

UNITED STATES PATENT AND TRADEMARK OFFICE
CERTIFICATE OF CORRECTION

PATENT NO. : 6,268,984 B1
DATED : July 31, 2001
INVENTOR(S) : Zine-Eddine Boutaghou Page 1 of 1

It is certified that error appears in the above-identified patent and that said Letters Patent is hereby corrected as shown below:

Column 4,
Line 26, delete "B", insert -- $B_g$ --

Signed and Sealed this

Twenty-first Day of May, 2002

Attest:

Attesting Officer

JAMES E. ROGAN
Director of the United States Patent and Trademark Office